United States Patent
Bhorkar et al.

(10) Patent No.: US 10,542,460 B2
(45) Date of Patent: Jan. 21, 2020

(54) ENERGY DETECTION THRESHOLD ADAPTATION FOR LICENSED ASSISTED ACCESS OF LTE IN UNLICENSED BAND

(71) Applicant: INTEL IP CORPORATION, Santa Clara, CA (US)

(72) Inventors: Abhijeet Bhorkar, Fremont, CA (US); Laurent Cariou, Portland, OR (US); Hwan Joon Kwon, Santa Clara, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 15/751,127

(22) PCT Filed: Dec. 26, 2015

(86) PCT No.: PCT/US2015/000447
§ 371 (c)(1),
(2) Date: Feb. 7, 2018

(87) PCT Pub. No.: WO2017/026981
PCT Pub. Date: Feb. 16, 2017

(65) Prior Publication Data
US 2018/0234886 A1    Aug. 16, 2018

Related U.S. Application Data

(60) Provisional application No. 62/204,907, filed on Aug. 13, 2015.

(51) Int. Cl.
*H04W 28/18* (2009.01)
*H04W 74/08* (2009.01)
*H04W 16/14* (2009.01)

(52) U.S. Cl.
CPC ....... *H04W 28/18* (2013.01); *H04W 74/0808* (2013.01); *H04J 2211/005* (2013.01); *H04W 16/14* (2013.01)

(58) Field of Classification Search
CPC ............... H04L 12/413; H04L 12/417; H04L 2012/6451; H04L 25/49; H04L 49/254;
(Continued)

(56) References Cited

U.S. PATENT DOCUMENTS

2001/0028639 A1* 10/2001 Eikelenboom ........ H04W 28/18
370/338
2015/0056931 A1* 2/2015 Yerramalli ............ H04B 17/00
455/67.13
(Continued)

FOREIGN PATENT DOCUMENTS

WO    2014/071308 A1    5/2014
WO    2015/027161 A2    2/2015

OTHER PUBLICATIONS

International Search Report and Written Opinion for PCT/US2015/000447 dated May 2, 2016.
(Continued)

*Primary Examiner* — Brenda H Pham
(74) *Attorney, Agent, or Firm* — Eschweiler & Potashnik, LLC

(57) ABSTRACT

When performing a contention protocol, such as Listen-Before-Talk (LBT), an Long Term Evolution (LTE)-Licensed Assisted Access (LAA) node dynamically adapts the ED threshold used by the LTE-LAA node depending on whether other transmission nodes are detected at the frequency components that are to be used by the LTE-LAA node. In one implementation, the ED threshold value may initially be set to a conservative value, and when other transmissions nodes are not detected, the ED threshold value may be set to a more aggressive value. In another implementation, the ED threshold value may initially be set to a more aggressive value, and only when another transmission node is detected, the ED threshold value may be set to a more conservative value. In yet another possible implemen-
(Continued)

tation, the ED threshold value and the transmit power may be proportionally modified, for a particular UE, based on a parameter associated with the UE.

17 Claims, 7 Drawing Sheets

(58) Field of Classification Search
CPC ..... H04L 12/40084; H04L 2012/5678; H04W 74/08; H04J 3/245
USPC ....... 370/229, 447, 448, 450, 459, 461, 462, 370/235
See application file for complete search history.

(56) References Cited

U.S. PATENT DOCUMENTS

| | | | |
|---|---|---|---|
| 2015/0071220 A1* | 3/2015 | Luo | H04L 5/001 370/329 |
| 2016/0173361 A1* | 6/2016 | Somasundaram | H04L 43/16 370/328 |
| 2016/0219448 A1* | 7/2016 | Davydov | H04W 74/0816 |
| 2017/0014796 A1* | 1/2017 | Li | H01L 31/0264 |
| 2017/0208624 A1* | 7/2017 | Zhang | H04W 74/0808 |
| 2017/0273109 A1* | 9/2017 | Babaei | H04W 74/0808 |
| 2018/0007643 A1* | 1/2018 | Tiirola | H04W 52/241 |
| 2018/0176956 A1* | 6/2018 | Koutsimanis | H04W 74/04 |

OTHER PUBLICATIONS

Broadcom Corporation, 3GPP TSG RAN WG1 Meeting #81 R1-152939, "Alternatives for LAA LBT Energy Detection Threshold Adaptation", May 2015 (available at http://www.3gpp.org/ftp/tsg_ran/WG1_RL1/TSGR1_81/Docs/R1-152939.zip).

3GPP TR 36.889 V13.0.0 (Jun. 2015), "Technical Specification Group Radio Access Network—Study on Licensed-Assisted Access to Unlicensed Spectrum", Jun. 2015 (available at http://www.3gpp.org/ftp/Specs/archive/36_series/36.889/36889-d00.zip).

Samsung et al., 3GPP TSG RAN WG1 #80bis R1-152375, "WF on CCA threshold and maximum transmission power", Apr. 2015 (available at http://www.3gpp.org/ftp/tsg_ran/WG1_RL1/TSGR1_80b/Docs/R1-152375.zip).

ETSI EN 301 893 v1.8.1, "Broadband Radio Access Networks (BRAN); 5 GHz high performance RLAN; Harmonized EN covering the essential requirements of article 3.2 of the R&TTE Directive", Mar. 2015 (available at http://www.etsi.org/deliver/etsi_en/301800_301899/301893/01.08.01_60/en_301893v010801p.pdf).

* cited by examiner

ENERGY DETECTION THRESHOLD ADAPTATION FOR LICENSED ASSISTED ACCESS OF LTE IN UNLICENSED BAND

RELATED APPLICATIONS

The present application claims the benefit of U.S. Provisional Patent Application No. 62/204,907, which was filed on Aug. 13, 2015; and of PCT/US15/00447, filed on Dec. 26, 2015, the contents of which are hereby incorporated by reference as though fully set forth herein.

BACKGROUND

The demand for wireless broadband data has consistently increased. Unlicensed spectrum (i.e., frequency spectrum that does not require a license from an appropriate regulating entity) is being considered by wireless cellular network operators to increase the capacity of existing services that are offered over licensed spectrum.

The use of unlicensed spectrum in the Third Generation Partnership Project (3GPP) Long Term Evolution-Advanced (LTE-A) system has been proposed as Licensed Assisted Access (LAA). Under LAA, the LTE standard is extended into unlicensed frequency deployments, thus enabling operators and vendors to maximally leverage the existing or planned investments in LTE hardware in the radio and core network.

One concern with LAA is the co-existence of the LTE radio nodes and other radio access technologies (RATs), such as WiFi and/or other LAA networks deployed by other operators using other unlicensed radio nodes. To enable the co-existence of the LTE radio nodes and other unlicensed nodes, listen-before-talk (LBT) (also called Clear Channel Assessment (CCA)) has been proposed. LBT is a contention protocol in which the LTE radio node determines whether a particular frequency channel is already occupied (e.g., by a WiFi node) before using the particular frequency channel. That is, with LBT, data packets may only be transmitted when a channel is sensed to be idle.

BRIEF DESCRIPTION OF THE DRAWINGS

Embodiments will be readily understood by the following detailed description in conjunction with the accompanying drawings. To facilitate this description, like reference numerals may designate like structural elements. Embodiments are illustrated by way of example and not by way of limitation in the figures of the accompanying drawings.

DETAILED DESCRIPTION OF PREFERRED EMBODIMENTS

Figure 1:
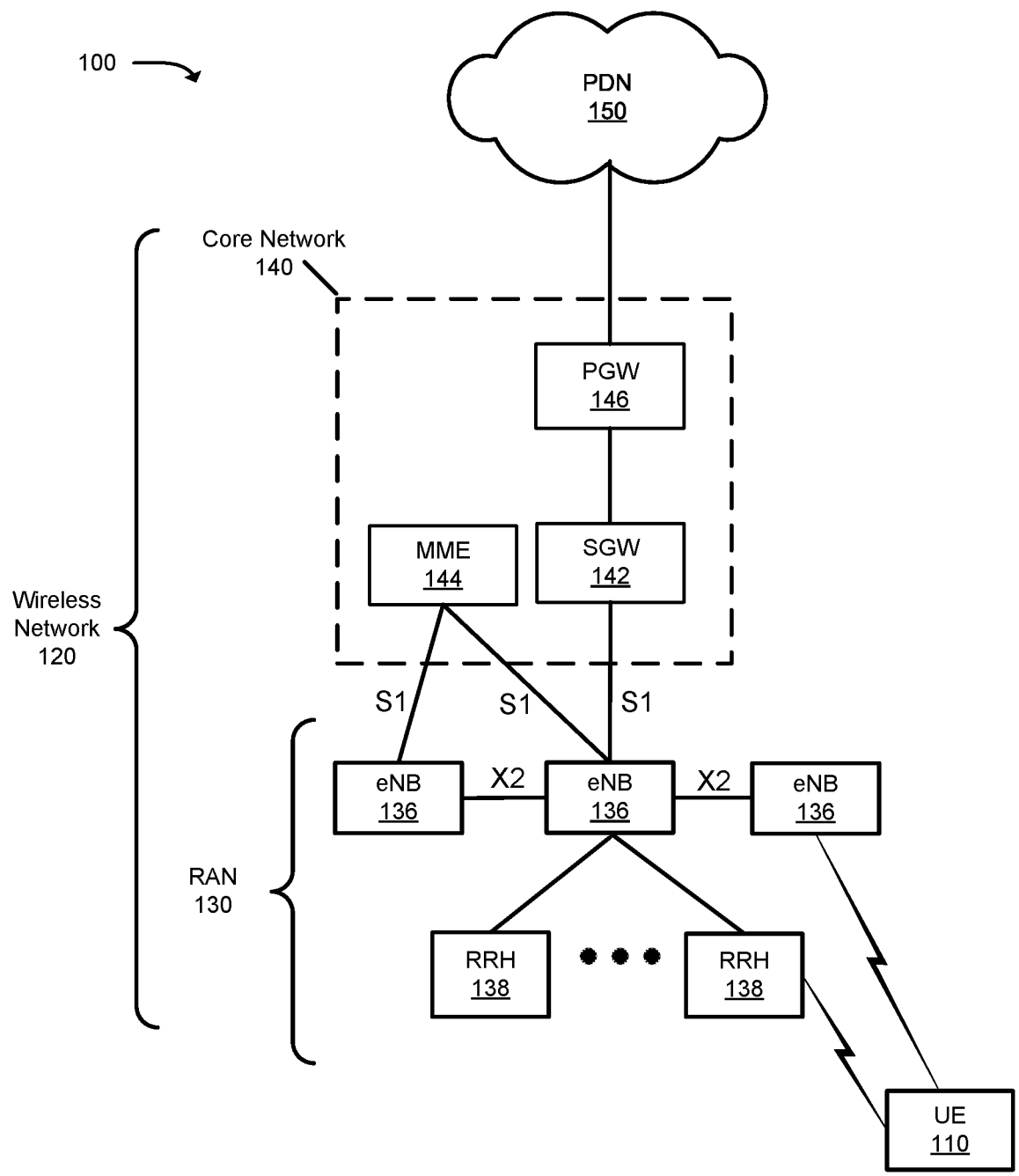
FIG. 1 is a diagram of an example environment in which systems and/or methods described herein may be implemented.

The following detailed description refers to the accompanying drawings. The same reference numbers in different drawings may identify the same or similar elements. It is to be understood that other embodiments may be utilized and structural or logical changes may be made without departing from the scope of the present disclosure. Therefore, the following detailed description is not to be taken in a limiting sense, and the scope of embodiments in accordance with the present disclosure is defined by the appended claims and their equivalents.

Existing WiFi (i.e., Institute of Electrical and Electronics Engineers (IEEE) 802.11-based wireless networking standards) technologies, to enable the co-existence of multiple WiFi Access Points (APs), may use the Carrier Sense Multiple Access with Collision Avoidance (CSMA/CA) technique to enable co-existence between multiple WiFi nodes. Under CSMA/CA, when a WiFi transmitter (e.g., a WiFi access point (AP)) detects a WiFi preamble of another WiFi transmitter, with a received energy level of at-least −82 dBm (decibel-milliwatts), the WiFi transmitter is required to defer its transmission based on a duration included in the detected preamble (physical carrier sensing). In some situations, the WiFi transmitter may not be able to detect the WiFi preamble. For instance, an LTE-LAA node may use the same frequency band as the WiFi transmitter. In this situation, the WiFi transmitter may use a −62 dBm threshold to determine when to defer its transmission. The WiFi transmitter may defer transmission at least until the detected energy level is below −62 dBm. In this manner, existing WiFi implementations may use a predetermined energy detection (ED) thresholds (e.g., −82 dBm and −62 dBm) when determining whether a channel is "clear" for transmission.

ED thresholds may be used by LTE-LAA nodes during the LBT contention protocol to sense other LTE-LAA nodes as well as non LTE-LAA nodes (e.g., WiFi transmitters). In particular, under LAA, an LTE-LAA node may defer its transmission at least until the energy received by is less than a certain ED threshold. However, using predetermined ED thresholds, for LTE-LAA nodes, may be problematic for good co-existence between the LTE-LAA nodes and between transmitters of other RATs (e.g., WiFi transmitters). For example, WiFi throughput, in certain scenarios such as in indoor operation, can be significantly degraded in the presence of LTE-LAA nodes using a −62 dBm ED threshold. A conservative ED threshold of −82 dBm may enable good co-existence between WiFi and LAA in indoor scenarios. In other scenarios, however, such as an outdoor scenario, the use of −62 dBm as the ED threshold can enable good co-existence between WiFi and LAA.

Consistent with aspects described herein, when performing a contention protocol, such as LBT, an LTE-LAA node may dynamically adapt the ED threshold used by the LTE-LAA node depending on whether other transmission nodes are detected at the frequency components that are to be used by the LTE-LAA node. In one implementation, the ED threshold value may initially be set to a conservative value, and when other transmissions nodes are not detected, the ED threshold value may be set to a more aggressive value. In another implementation, the ED threshold value may initially be set to a more aggressive value, and only when another transmission node is detected, the ED threshold value may be set to a more conservative value. In yet another possible implementation, the ED threshold value and the transmit power may be proportionally modified, for a particular UE, based on a parameter associated with the UE.

FIG. 1 is a diagram of an example environment 100, in which systems and/or methods described herein may be implemented. As illustrated, environment 100 may include User Equipment (UE) 110, which may obtain network connectivity from wireless network 120. Although a single UE 110 is shown, for simplicity, in FIG. 1, in practice, multiple UEs 110 may operate in the context of a wireless network. Wireless network 120 may provide access to one or more external networks, such as packet data network (PDN) 150. The wireless network may include radio access network (RAN) 130 and core network 140. RAN 130 may be a E-UTRA based radio access network or another type of radio access network. Some or all of RAN 130 may be associated with a network operator that controls or otherwise manages core network 140. Core network 140 may include an Internet Protocol (IP)-based network.

UE 110 may include a portable computing and communication device, such as a personal digital assistant (PDA), a smart phone, a cellular phone, a laptop computer with connectivity to a cellular wireless network, a tablet computer, etc. UE 110 may also include non-portable computing devices, such as desktop computers, consumer or business appliances, or other devices that have the ability to wirelessly connect to RAN 130.

UEs 110 may be designed to operate using LTE-LAA. For instance, UEs 110 may include radio circuitry that is capable of simultaneously receiving multiple carriers: a first, primary, carrier using licensed spectrum and a second carrier using unlicensed spectrum. The second carrier may correspond to, for example, the unlicensed 5 GHz spectrum. This spectrum may commonly be used by WiFi devices. A goal of LTE-LAA may be to not impact WiFi services more than an additional WiFi network on the same carrier.

UEs 110 capable of operating on the unlicensed band may be configured to make measurements to support unlicensed band operation, including providing feedback when the UE is in the coverage area of an LTE-LAA node. Once the connection is activated to allow use on the unlicensed band, existing Channel Quality Information (CQI) feedback may allow the evolved NodeBs (eNBs) 136 to determine what kind of quality could be achieved on the unlicensed band compared to the licensed band. Downlink only mode is particularly suited for situations where data volumes are dominated by downlink traffic.

RAN 130 may represent a 3GPP access network that includes one or more RATs. RAN 130 may particularly include multiple base stations, referred to as eNBs 136. eNBs 136 may include eNBs that provide coverage to a relatively large (macro cell) area or a relatively small (small cell) area. Small cells may be deployed to increase system capacity by including a coverage area within a macro cell. Small cells may include picocells, femtocells, and/or home NodeBs. eNBs 136 can potentially include remote radio heads (RRH), such as RRHs 138. RRHs 138 can extend the coverage of an eNB by distributing the antenna system of the eNB. RRHs 138 may be connected to eNB 136 by optical fiber (or by another low-latency connection).

In the discussion herein, an LTE-LAA node may correspond to eNB 136 (small cell or macro cell) or RRH 138. The LTE-LAA node may also be referred to as an "LTE-LAA transmission point," "LTE-LAA transmitter," or "LAA eNB." For simplicity, eNB 136 will be discussed herein as corresponding to an LTE-LAA node. In some implementations, the LTE-LAA node (using unlicensed frequency) may be co-located with a corresponding eNB that uses licensed frequency. The licensed frequency eNBs and the LTE-LAA node may maximize downlink bandwidth by performing carrier aggregation of the licensed and unlicensed bands.

Core network 140 may include an IP-based network. In the 3GPP network architecture, core network 140 may include an Evolved Packet Core (EPC). As illustrated, core network 140 may include serving gateway (SGW) 142, Mobility Management Entity (MME) 144, and packet data network gateway (PGW) 146. Although certain network devices are illustrated in environment 100 as being part of RAN 130 and core network 140, whether a network device is labeled as being in the "RAN" or the "core network" of environment 100 may be an arbitrary decision that may not affect the operation of wireless network 120.

SGW 142 may include one or more network devices that aggregate traffic received from one or more eNBs 136. SGW 142 may generally handle user (data) plane traffic. MME 144 may include one or more computation and communication devices that perform operations to register UE 110 with core network 140, establish bearer channels associated with a session with UE 110, hand off UE 110 from one eNB to another, and/or perform other operations. MME 144 may generally handle control plane traffic.

PGW 146 may include one or more devices that act as the point of interconnect between core network 140 and external IP networks, such as PDN 150, and/or operator IP services. PGW 146 may route packets to and from the access networks, and the external IP networks.

PDN 150 may include one or more packet-based networks. PDN 150 may include one or more external networks, such as a public network (e.g., the Internet) or proprietary networks that provide services that are provided by the operator of core network 140 (e.g., IP multimedia (IMS)-based services, transparent end-to-end packet-switched streaming services (PSSs), or other services).

A number of interfaces are illustrated in FIG. 1. An interface may refer to a physical or logical connection between devices in environment 100. The illustrated interfaces may be 3GPP standardized interfaces. For example, as illustrated, communication eNBs 136 may communicate with SGW 142 and MME 144 using the S1 interface (e.g., as defined by the 3GPP standards). eNBs 136 may communicate with one another via the X2 interface.

The quantity of devices and/or networks, illustrated in FIG. 1, is provided for explanatory purposes only. In practice, there may be additional devices and/or networks; fewer devices and/or networks; different devices and/or networks; or differently arranged devices and/or networks than illustrated in FIG. 1. Alternatively, or additionally, one or more of the devices of environment 100 may perform one or more functions described as being performed by another one or more of the devices of environment 100. Furthermore, while "direct" connections are shown in FIG. 1, these connections should be interpreted as logical communication pathways, and in practice, one or more intervening devices (e.g., routers, gateways, modems, switches, hubs, etc.) may be present.

Figure 2:
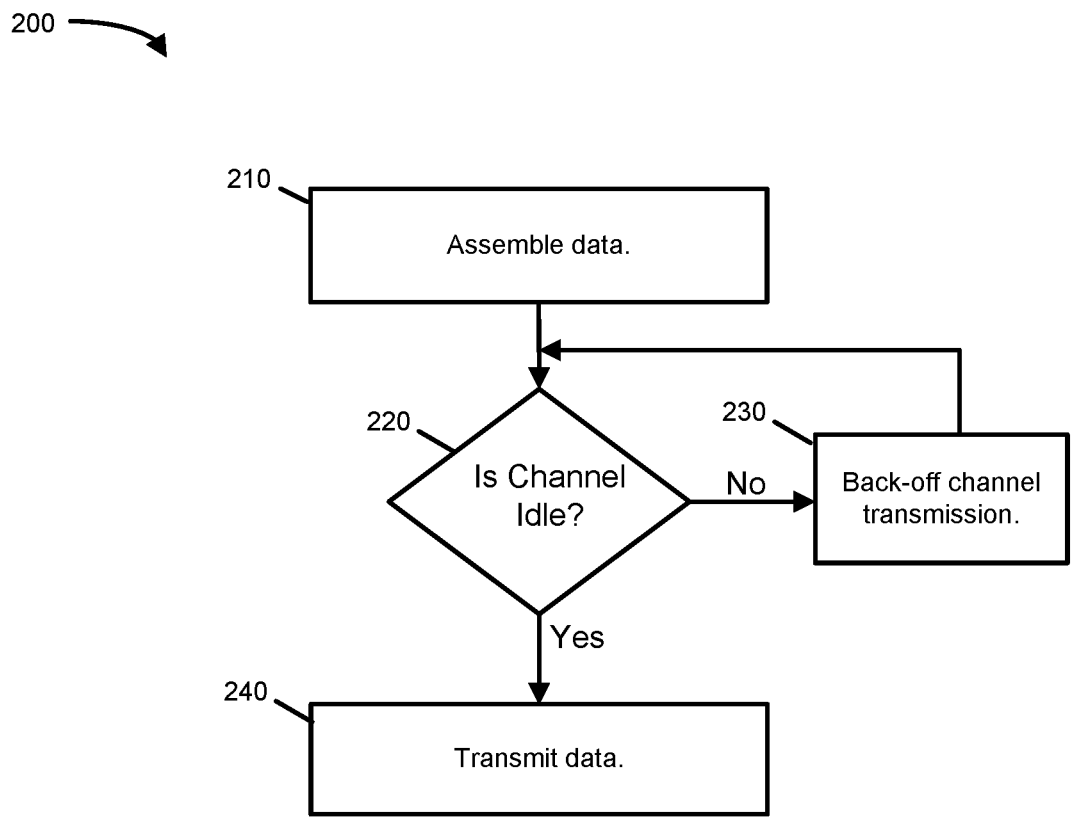
FIG. 2 is a flowchart illustrating a process that illustrates an overview of LBT.

FIG. 2 is a flowchart illustrating a process 200 that provides an overview of LBT. Process 200 may be performed by, for example, eNB 136 (i.e., by an eNB that acts as an LTE-LAA node).

Process 200 may include assembling data that is to be transmitted (block 210). The data may be assembled, for example, as a packet or as another data structure (e.g., a frame), by eNB 136, and for transmission to UE 110.

Process 200 may further include determining whether the channel, for which the data is to be transmitted, is idle (block 220). The determination of whether a particular frequency channel is idle may include measuring the energy associated with the channel and comparing the measured energy value to a threshold. In some implementations, the threshold may be dynamically or semi-statically selected. For example, depending on the deployment situation, the threshold value may be selected between −62 dBm and −82 dBm. In some implementations, the determination of whether the channel is idle may additionally involve physical carrier sensing to read information transmitted in the frequency channel. For example, for a WiFi transmission, the WiFi preamble or beacon may be read to obtain information.

When the channel is determined to not be idle (block 220—No), the eNB may perform a back-off procedure (block 230). The back-off procedure may include waiting a predetermined amount of time before attempting to use the channel again, waiting a random amount of time before attempting to use the channel again, or waiting an amount of time that is determined from another source (e.g., a WiFi preamble). In some implementations, the back-off procedure may potentially include the selection of different frequency channel.

When the channel is determined to be idle (block 220—No), the assembled data may be transmitted on the channel (block 240). In this manner, LTE-LAA deployments may co-exist with other RATs or with LTE-LAA deployments from other network operators.

Figure 3:
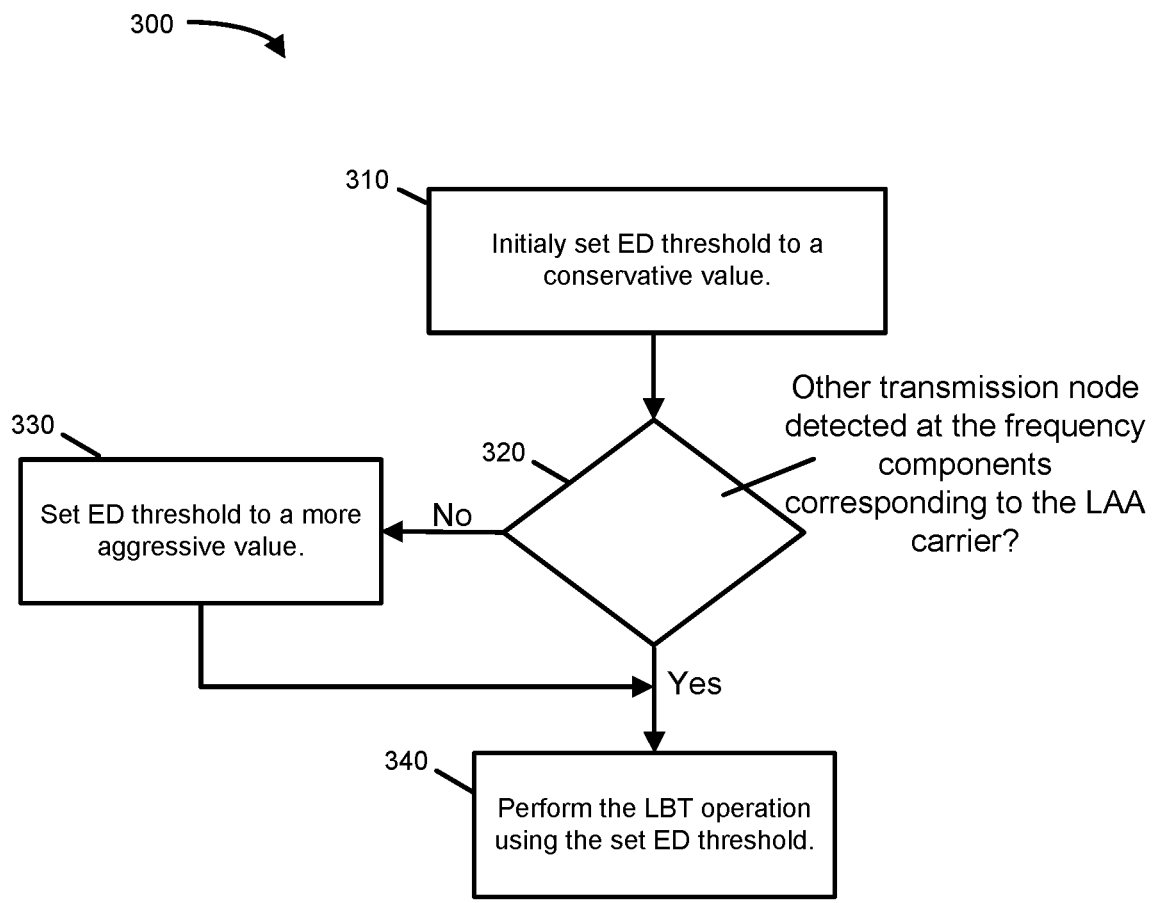
FIGS. 3-5 are flowcharts illustrating an processes that illustrates different embodiments for performing LBT using energy detection threshold adaptation for LTE-LAA.

FIG. 3 is a flowchart illustrating an example process 300 that illustrates one example embodiment for performing LBT using ED threshold adaptation for LTE-LAA. Process 300 may be performed by UE 110 or by eNB 136 (i.e., by an eNB that acts as an LTE-LAA node).

Process 300 may include initially setting the ED threshold to a conservative value (block 310). In one implementation, the conservative ED threshold may be set at a value of −72 dBm. Alternatively, the conservative ED threshold may be set at a value of −82 dBm. More generally, the conservative value may be at the lower half of the range of potential ED threshold values. For example, if the range of potential ED threshold values is between −52 dBm and −82 dBm, a conservative ED threshold value may be between −72 dBm and −82 dBm for an eNB operating on 20 MHz channel bandwidth.

Process 300 may further include determining whether other transmission nodes are detected at the frequency components corresponding to the LAA carrier (block 320). In one implementation, whether other transmission nodes are detected at the frequency components corresponding to the LAA carrier may include determining whether a nearby WiFi transmitter (e.g., a WiFi AP) is present. The determination may potentially be made by eNB 136, UE 110, or both eNB 136 and UE 110. Example implementations for the detection of a nearby WiFi transmitter will be described in more detail below.

In some implementations, the detected other transmission nodes of block 320 may include other LTE-LAA nodes, such as other LTE-LAA nodes associated with other network operators (i.e., with a network operator different than the network operator that manages RAN 130).

When another transmission node is not detected (block 320—No), process 300 may further include setting the ED threshold to a more aggressive value. In one implementation, the more aggressive ED threshold may be set to a value of −62 dBm. With a more aggressive value, LBT back-off is less likely to be performed. More generally, the aggressive may be at the upper half of the range of potential ED threshold values. For example, if the range of potential ED threshold values is between −52 dBm and −82 dBm, an aggressive ED threshold value may be between −52 dBm and −62 dBm.

Process 300 may further include performing the LBT operation using the set ED threshold value (block 340). As shown in FIG. 3, the set ED threshold value may be the conservative value when another transmission node is detected (block 320—Yes) or the more aggressive value when another transmission node is not detected (block 320—No). The LBT operation may be performed pursuant to process 200 (FIG. 2). For example, the LBT operation may include the operations associated with block 220 and 230 of process 200, or, alternatively or additionally, the LBT operation may include the operations associated with blocks 210-240 of process 200.

Figure 4:
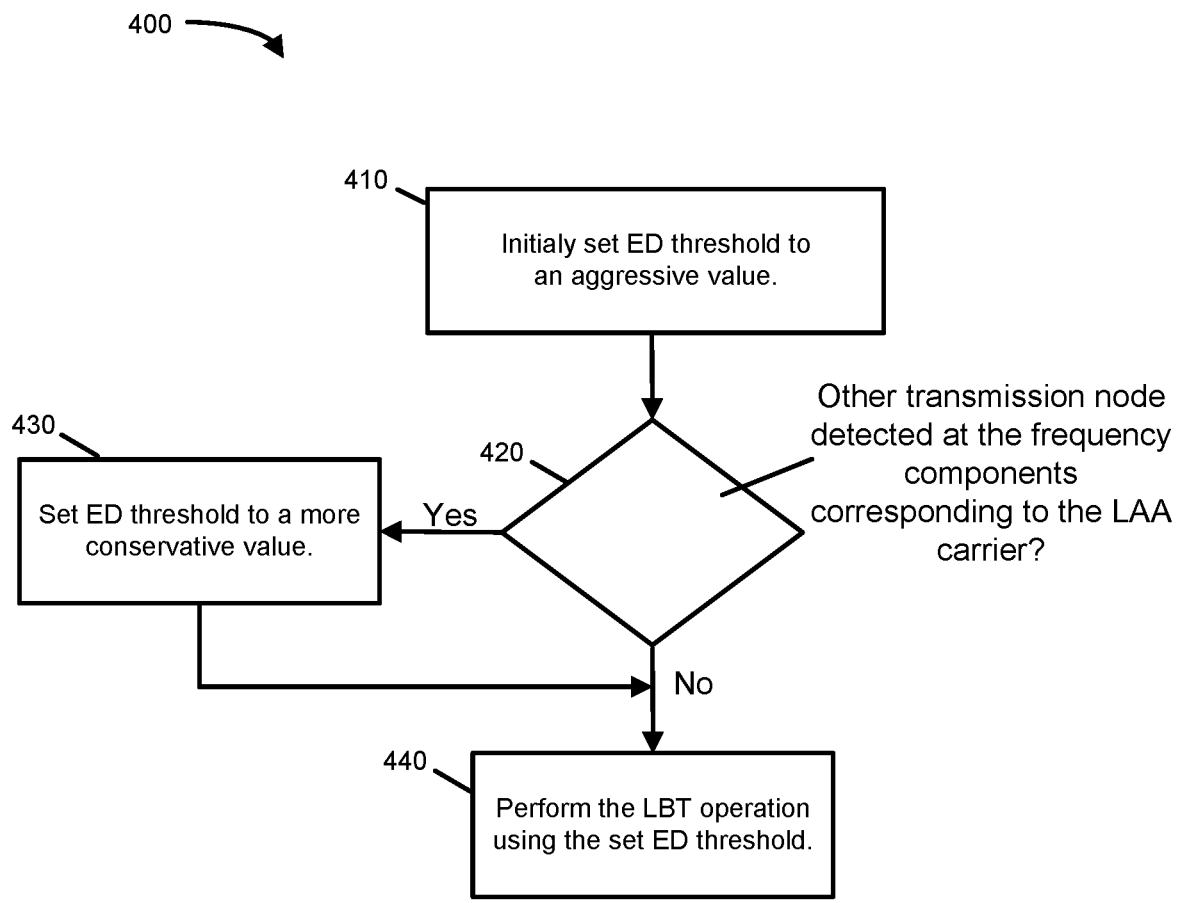

FIG. 4 is a flowchart illustrating an example process 400 that illustrates a second example embodiment for performing LBT using ED threshold adaptation for LTE-LAA. Process 400 may be performed by UE 110 or by eNB 136 (i.e., by an eNB that acts as an LTE-LAA node).

Process 400 may include initially setting the ED threshold to a relatively aggressive value (block 410). In one implementation, the aggressive ED threshold may be set at a value of −62 dBm.

Process 400 may further include determining whether other transmission nodes are detected at the frequency components corresponding to the LAA carrier (block 420). In one implementation, whether other transmission nodes are detected at the frequency components corresponding to the LAA carrier may include determining whether a nearby WiFi transmitter (e.g., a WiFi AP) is present. The determination may potentially be made by eNB 136, UE 110, or both eNB 136 and UE 110. Example implementations for the detection of a nearby WiFi transmitter are described in more detail below.

In some implementations, the detected other transmission nodes of block 320 may include other LTE-LAA nodes, such as other LTE-LAA nodes associated with other network operators (i.e., with a network operator different than the network operator that manages RAN 130).

When another transmission node is detected (block 420—Yes), process 400 may further include setting the ED threshold to a more conservative value. In one implementation, the more conservative ED threshold may be set to a value of −82 dBm. Alternatively, the more conservative ED threshold may be set to a value of −78 dBm. With the more conservative ED value, LBT back-off is more likely to be performed.

Process 400 may further include performing the LBT operation using the set ED threshold value (block 440). As shown in FIG. 4, the set ED threshold value may be the conservative value when another transmission node is detected (block 420—Yes) or the more aggressive value when another transmission node is not detected (block 420—No). The LBT operation may be performed pursuant to process 400 (FIG. 4). For example, the LBT operation may include the operations associated with block 220 and 230 of process 200, or, alternatively or additionally, the LBT operation may include the operations associated with blocks 210-240 of process 200.

In processes 300 and 400, detection of another frequency node, such as a WiFi transmission node, is performed (e.g., blocks 320 and 420). A number of different techniques may be used to detect the presence of a WiFi transmission node, some of which will next be discussed.

In one possible implementation for detecting the presence of a WiFi transmission node, eNB 136 may detect the presence of WiFi beacon frames. A beacon frame is one of the management frames in IEEE 802.11 based Wireless Local Area Networks (WLANs). Beacon frames may be transmitted periodically to announce the presence of a WiFi LAN. To detect the presence of a WiFi transmission point, eNB 136 may detect the presence of beacon frames with a signal strength that is greater than the ED threshold value (e.g., −82 dBm).

In a second possible implementation for detecting the presence of a nearby WiFi transmission node, WLAN measurements may be obtained by UE 110. The WLAN measurements may be reported, by UE 110, to eNB 136. For example, UE 110 may report the measurements via licensed frequency channels. In one implementation, the UE 110 may report the Received Signal Strength Indicator (RSSI) associated with WiFi beacons, Basic Service Set Identifier (BSSIDs) included in the WiFi beacons, and/or other metrics obtained from the beacons, such as WiFi channel utilization, WiFi transmission bandwidth, etc. In this manner, UE 110 may potentially assist eNB 136 to identify the presence of WiFi on the component carriers used for transmission (e.g., for downlink burst transmission). The WLAN measurement report, transmitted by UE 110, may be performed periodically (or at some other interval) or event driven, such as based on the detection of a new WiFi AP or based on a previously detected WiFi AP no longer being detected.

In a third possible implementation for detecting the presence of a nearby WiFi transmission node, UE 110 and/or eNB 136 may detect the WiFi preamble. The WiFi preamble may be the first part of the Physical Layer Convergence Protocol/Procedure (PLCP) Protocol Data Unit (PDU).

In some implementations, multiple ones of the above-discussed three possible implementations for detecting the presence of a nearby WiFi transmission node may be used. For information detected by UE 110, UE 110 may be configured to transmit a WiFi measurement report, to eNB 136, if the measurement, made by UE 110, changes significantly from the previous measurement reported to eNB 136. For example, a measurement report may be transmitted to eNB 136 when the number of observed WiFi APs changes.

Figure 5:
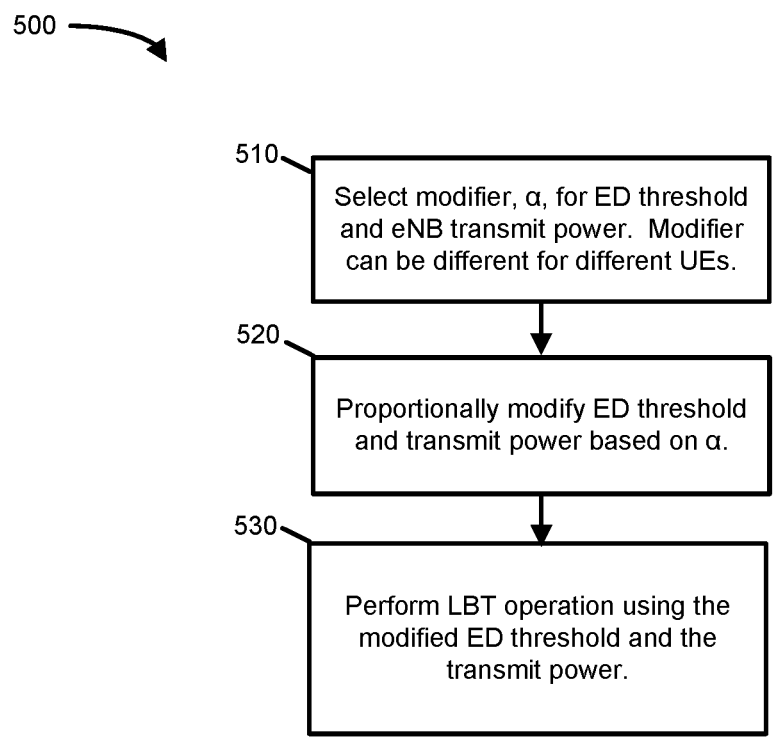

FIG. 5 is a flowchart illustrating an example process 500 that illustrates a third example embodiment for performing LBT using ED threshold adaptation for LTE-LAA. Process 500 may be performed by, for example, eNB 136 (i.e., by an eNB that acts as an LTE-LAA node).

In general, with respect to process 500, eNB 136 may proportionally determine, on a per-UE basis, an ED threshold and the transmit (Tx) power to use for downlink transmissions of the data once the channel has been acquired. This "proportional role," as used by eNB 136, may act to balance two behaviors: (1) by raising the ED threshold, eNB 136 can be more aggressive in accessing the channel; and (2) by correspondingly lowering the Tx power, eNB 136 can create less interference with neighboring transmitters, thus allowing the neighboring transmitters to more frequently access the channel. Stated equivalently, with the proportional rule, by lowering the ED threshold, eNB 136 can be less aggressive (more conservative) in accessing the channel but may then correspondingly raise the Tx power to provide better throughput when the channel is being used. With the proportional rule, as described herein, the spatial reuse benefits of raising the ED threshold can be preserved, while ensuring fairness and co-existence due to the lower Tx power.

Process 500 may include selecting a modifier, called α herein, that will be used to proportionally modify the ED threshold and the eNB transmit power (block 510). A modifier can be different for different UEs (block 510). In one implementation, the modifier may be selected on a per-UE basis.

As one example, α may be selected as being between zero and 15 dBm, where α is set to zero for UEs that are close (e.g., within a certain physical range of eNB 136), 15 dBm for UEs that are not close to eNB 136 (e.g., near the outer edge of the cell), and linearly scaled between zero and 15 dBm for UEs that are between the "close" and "not close" points. In this example, the distance of each particular UE, relative to the cell boundary may be used to modify α. In other implementations, other parameters relating to UE 110, such as the received signal strength, relating to UE 110, may be used to determine α. In some implementations, α may be determined based on information received via a licensed band.

Process 500 may further include proportionally modifying the ED threshold and transmit power based on α (block 520). In one implementation, the ED threshold value may be increased based on α (or based on a value obtained from α) and the transmit power, of eNB 136 to UE 110, many correspondingly be decreased based on α (or based on a value obtained from α). For example, the following expressions may be used to modify the ED threshold and the transmit power.

$$ED\_Threshold = Initial\_ED\_Threshold + ED\_Thresh\_Raise\_Value; \text{ and}$$

$$Tx\_Power = Max\_Power - Tx\_Power\_Reduction\_Value$$

In the above expressions, "Ed_Threshold" refers to the ED threshold value, "Initial_ED_Threshold" refers to the default or base ED threshold value, "ED_Thresh_Raise_Value" refers to the amount to increase the default value of the ED threshold, "Tx_Power" refers to the transmit power of eNB 136 or UE 110, "Max_Power" refers to the maximum possible transmit power, and "Tx_Power_Reduction_Value" refers to the amount to reduce the maximum possible transmit power. In one implementation, ED_Thresh_Raise_Value and Tx_Power_Reduction_Value may both be set equal to α.

As an example of the expressions for ED_Threshold and Tx_Power, as given in the previous paragraph, consider the situation in which the initial ED threshold is −82 dBm, the maximum transmit power is 23 dBm, and α is determined to be 10 dBm. In this situation, the ED threshold may be calculated as −72 dBm (−82+10) and the transmit power may be calculated as 13 dBm (23−10). Thus, as the ED threshold is made more aggressive, the transmit power may proportionally be decreased. In other words, the ED threshold and the transmit power may be modified in an inverse manner with respect to one another.

Process 500 may further include performing the LBT operation using the modified ED threshold and the transmit power (block 530). For example, the LBT operation may include the operations associated with block 220 and 230 of process 200, or, alternatively or additionally, the LBT operation may include the operations associated with blocks 210–240 of process 200.

Figure 6:
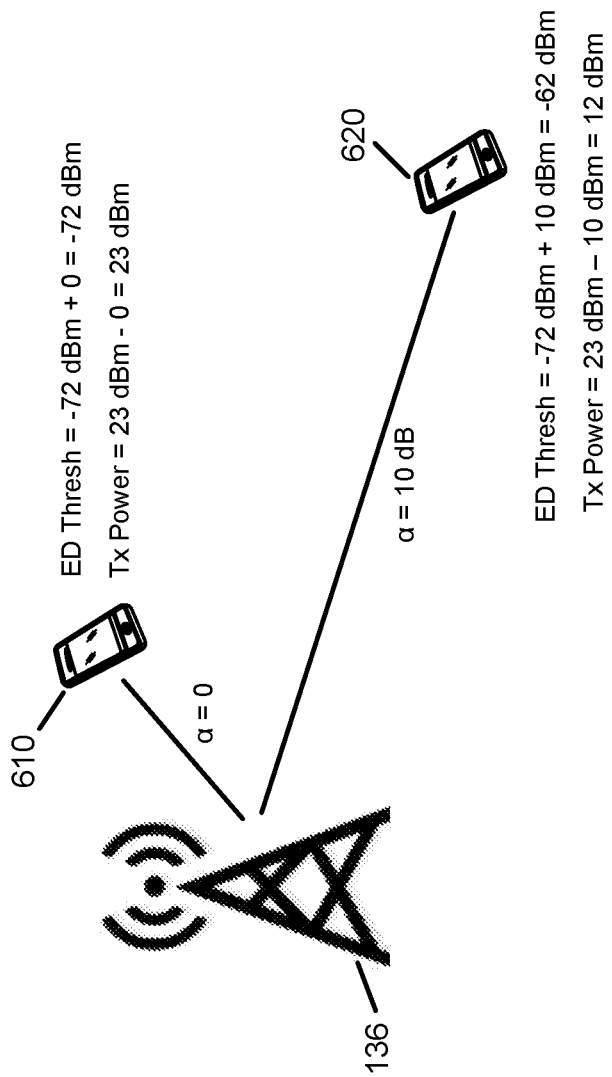
FIG. 6 is a diagram conceptually illustrating an example implementation consistent with the process shown in FIG. 5.

FIG. 6 is a diagram conceptually illustrating an example implementation consistent with process 500. In FIG. 6, assume that eNB 136 communicates, using licensed and unlicensed channels, with UEs 610 and 620. The communication via the unlicensed channels may be performed via LTE-LAA.

In FIG. 6, assume that eNB 136 is determined to be relatively close to UE 610. For example, via LTE-based communications in the licensed band, eNB 136 may determine that UE 610 is near eNB 136 and/or receives a good signal strength signal from eNB 136. eNB 136 may correspondingly determine that a, for UE 610, should be set to zero. As shown, assuming that the default or previously set ED threshold for UE 610 is −72 dBm and the default or maximum transmit power is 23 dBm, the proportionally modified ED threshold value and transmit power may remain at −72 dBm and 23 dBm, respectively.

Assume that UE 620 is determined to be farther away from eNB 136. For example, via LTE-based communications in the licensed band, eNB 136 may determine that UE 620 is near the edge of the coverage area provided by eNB 136 and/or receives a poor signal from eNB 136. eNB 136 may correspondingly determine that α, for UE 610, should be set to 10 dBm. As shown, assuming that the default or previously set ED threshold for UE 610 is −72 dBm and the default or maximum transmit power is 23 dBm, the proportionally modified ED threshold value and transmit power may be −62 dBm and 13 dBm, respectively.

The above-discussion for the setting of the ED threshold for LBT may typically apply in the downlink direction. In some implementations, however, uplink transmissions may be made using LTE-LAA. For example, it may be desirable for UE 110 to perform LBT for uplink Physical Uplink Shared CHannel (PUSCH) transmissions.

In some implementations, the ED threshold that should be used at UE 110 to perform LBT may be indicated by eNB 136. The ED threshold value at UE 110 can be different than that used at eNB 136. In one embodiment, UE 110 may always use a fixed (static) ED threshold, such as −62 dBm. In a second possible embodiment, UE 110 may use the same ED threshold that is used by eNB 136. In a third possible embodiment, UE 110 may use the ED threshold value used by eNB 136, plus an offset. In the second and third embodiments, the threshold may be signaled, semi-statically, by higher level signaling. Alternatively or additionally, the ED threshold can be signaled dynamically by Dedicated Control Information (DCI) using Layer 1 signaling. In some implementations, the ED threshold value can be cell specific (common to all UEs in the cell) or can be UE specific (different UEs within a cell may have different ED thresholds).

As used herein, the term "circuitry" or "processing circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Figure 7:
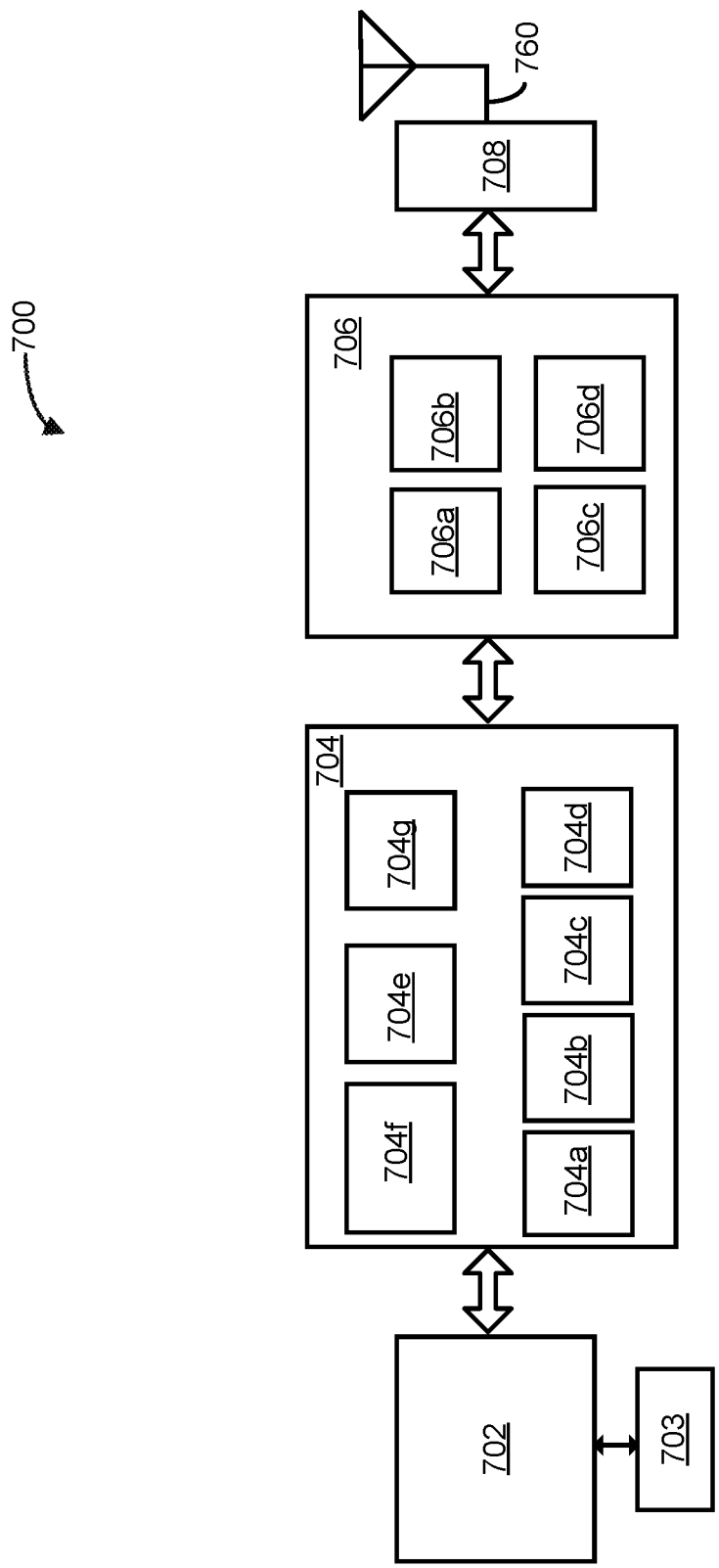
FIG. 7 illustrates example components of an electronic device.

Embodiments described herein may be implemented into a system using any suitably configured hardware and/or software. FIG. 7 illustrates, for one embodiment, example components of an electronic device 700. In embodiments, the electronic device 700 may be a user equipment UE, an eNB (such as eNB 136), a transmission point, or some other appropriate electronic device. In some embodiments, the electronic device 700 may include application circuitry 702, baseband circuitry 704, Radio Frequency (RF) circuitry 706, front-end module (FEM) circuitry 708 and one or more antennas 760, coupled together at least as shown.

Application circuitry 702 may include one or more application processors. For example, the application circuitry 702 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage, such as storage medium 703, and may be configured to execute instructions stored in the memory/storage to enable various applications and/or operating systems to run on the system. In some implementations, storage medium 703 may include a non-transitory computer-readable medium. Application circuitry 702 may, in some embodiments, connect to or include one or more sensors, such as environmental sensors, cameras, etc.

Baseband circuitry 704 may include circuitry such as, but not limited to, one or more single-core or multi-core processors. The baseband circuitry 704 may include one or more baseband processors and/or control logic to process baseband signals received from a receive signal path of the RF circuitry 706 and to generate baseband signals for a transmit signal path of the RF circuitry 706. Baseband processing circuitry 704 may interface with the application circuitry 702 for generation and processing of the baseband signals and for controlling operations of the RF circuitry 706. For example, in some embodiments, the baseband circuitry 704 may include a second generation (2G) baseband processor 704a, third generation (3G) baseband processor 704b, fourth generation (4G) baseband processor 704c, and/or other baseband processor(s) 704d for other existing generations, generations in development or to be developed in the future (e.g., fifth generation (5G), 7G, etc.). The baseband circuitry 704 (e.g., one or more of baseband processors 704a-d) may handle various radio control functions that enable communication with one or more radio networks via the RF circuitry 706. The radio control functions may include, but are not limited to, signal modulation/demodulation, encoding/decoding, radio frequency shifting, etc. In some implementations, baseband circuitry 604 may be associated with storage medium 703 or with another storage medium.

In embodiments where the electronic device 704 is implemented in, incorporates, or is otherwise part of an LTE-LAA transmission point, the baseband circuitry 104 may be to: identify one or more parameters related to the LTE-LAA transmission point, wherein the LTE-LAA transmission point is in a network that includes a plurality of LTE-LAA transmission points, respective LTE-LAA transmission points having respective parameters; and identify, based on a listen-before-talk (LBT) procedure related to identification of channel occupancy status of respective LTE-LAA transmission points in the plurality of LTE-LAA transmission points that the LTE-LAA transmission point has an unoccupied channel. RF circuitry 706 may be to transmit a signal based on the identification.

In some embodiments, modulation/demodulation circuitry of the baseband circuitry 704 may include Fast-Fourier Transform (FFT), precoding, and/or constellation mapping/demapping functionality. In some embodiments, encoding/decoding circuitry of the baseband circuitry 704 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments. In some embodiments, the baseband circuitry 704 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 704e of the baseband circuitry 704 may be configured to run elements of the protocol stack for signaling of the PHY, MAC, RLC, PDCP and/or RRC layers. In some embodiments, the baseband circuitry may include one or more audio digital signal processor(s) (DSP) 704f. The audio DSP(s) 704f may be include elements for compression/decompression and echo cancellation and may include other suitable processing elements in other embodiments.

Baseband circuitry 704 may further include memory/storage 704g. The memory/storage 704g may be used to load and store data and/or instructions for operations performed by the processors of the baseband circuitry 704. Memory/storage 704g may particularly include a non-transitory memory. Memory/storage for one embodiment may include any combination of suitable volatile memory and/or non-volatile memory. The memory/storage 704g may include any combination of various levels of memory/storage including, but not limited to, read-only memory (ROM) having embedded software instructions (e.g., firmware), random access memory (e.g., dynamic random access memory (DRAM)), cache, buffers, etc. The memory/storage 704g may be shared among the various processors or dedicated to particular processors.

Components of the baseband circuitry may be suitably combined in a single chip, a single chipset, or disposed on a same circuit board in some embodiments. In some embodiments, some or all of the constituent components of the baseband circuitry 704 and the application circuitry 702 may be implemented together such as, for example, on a system on a chip (SOC).

In some embodiments, the baseband circuitry 704 may provide for communication compatible with one or more radio technologies. For example, in some embodiments, the baseband circuitry 704 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 704 is configured to support radio communications of more than one wireless protocol may be referred to as multi-mode baseband circuitry.

RF circuitry 706 may enable communication with wireless networks using modulated electromagnetic radiation through a non-solid medium. In various embodiments, the RF circuitry 706 may include switches, filters, amplifiers, etc. to facilitate the communication with the wireless network. RF circuitry 706 may include a receive signal path which may include circuitry to down-convert RF signals received from the FEM circuitry 708 and provide baseband signals to the baseband circuitry 704. RF circuitry 706 may also include a transmit signal path which may include circuitry to up-convert baseband signals provided by the baseband circuitry 704 and provide RF output signals to the FEM circuitry 708 for transmission.

In some embodiments, the RF circuitry 706 may include a receive signal path and a transmit signal path. The receive signal path of the RF circuitry 706 may include mixer circuitry 706a, amplifier circuitry 706b and filter circuitry 706c. The transmit signal path of the RF circuitry 706 may include filter circuitry 706c and mixer circuitry 706a. RF circuitry 706 may also include synthesizer circuitry 706d for synthesizing a frequency for use by the mixer circuitry 706a of the receive signal path and the transmit signal path. In some embodiments, the mixer circuitry 706a of the receive signal path may be configured to down-convert RF signals received from the FEM circuitry 708 based on the synthesized frequency provided by synthesizer circuitry 706d. The amplifier circuitry 706b may be configured to amplify the down-converted signals and the filter circuitry 706c may be a low-pass filter (LPF) or band-pass filter (BPF) configured to remove unwanted signals from the down-converted signals to generate output baseband signals.

Output baseband signals may be provided to the baseband circuitry 704 for further processing. In some embodiments, the output baseband signals may be zero-frequency baseband signals, although this is not a requirement. In some embodiments, mixer circuitry 706a of the receive signal path may comprise passive mixers, although the scope of the embodiments is not limited in this respect.

In some embodiments, the mixer circuitry 706a of the transmit signal path may be configured to up-convert input baseband signals based on the synthesized frequency provided by the synthesizer circuitry 706d to generate RF output signals for the FEM circuitry 708. The baseband signals may be provided by the baseband circuitry 704 and may be filtered by filter circuitry 706c. The filter circuitry 706c may include a low-pass filter (LPF), although the scope of the embodiments is not limited in this respect.

In some embodiments, the mixer circuitry 706a of the receive signal path and the mixer circuitry 706a of the transmit signal path may include two or more mixers and may be arranged for quadrature downconversion and/or upconversion respectively. In some embodiments, the mixer circuitry 706a of the receive signal path and the mixer circuitry 706a of the transmit signal path may include two or more mixers and may be arranged for image rejection (e.g., Hartley image rejection). In some embodiments, the mixer circuitry 706a of the receive signal path and the mixer circuitry 706a may be arranged for direct downconversion and/or direct upconversion, respectively. In some embodiments, the mixer circuitry 706a of the receive signal path and the mixer circuitry 706a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 706 may include analog-to-digital converter (ADC) and digital-to-analog converter (DAC) circuitry and the baseband circuitry 704 may include a digital baseband interface to communicate with the RF circuitry 706.

In some dual-mode embodiments, a separate radio IC circuitry may be provided for processing signals for each spectrum, although the scope of the embodiments is not limited in this respect.

In some embodiments, the synthesizer circuitry 706d may be a fractional-N synthesizer or a fractional N/N+6 synthesizer, although the scope of the embodiments is not limited in this respect as other types of frequency synthesizers may be suitable. For example, synthesizer circuitry 706d may be a delta-sigma synthesizer, a frequency multiplier, or a synthesizer comprising a phase-locked loop with a frequency divider.

The synthesizer circuitry 706d may be configured to synthesize an output frequency for use by the mixer circuitry 706a of the RF circuitry 706 based on a frequency input and a divider control input. In some embodiments, the synthesizer circuitry 706d may be a fractional N/N+6 synthesizer.

In some embodiments, frequency input may be provided by a voltage-controlled oscillator (VCO), although that is not a requirement. Divider control input may be provided by either the baseband circuitry 704 or the applications processor 702 depending on the desired output frequency. In some embodiments, a divider control input (e.g., N) may be determined from a look-up table based on a channel indicated by the applications processor 702.

Synthesizer circuitry 706*d* of the RF circuitry 706 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+6 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 706*d* may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 706 may include an IQ/polar converter.

FEM circuitry 708 may include a receive signal path which may include circuitry configured to operate on RF signals received from one or more antennas 760, amplify the received signals and provide the amplified versions of the received signals to the RF circuitry 706 for further processing. FEM circuitry 708 may also include a transmit signal path which may include circuitry configured to amplify signals for transmission provided by the RF circuitry 706 for transmission by one or more of the one or more antennas 760.

In some embodiments, the FEM circuitry 708 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 706). The transmit signal path of the FEM circuitry 708 may include a power amplifier (PA) to amplify input RF signals (e.g., provided by RF circuitry 706), and one or more filters to generate RF signals for subsequent transmission (e.g., by one or more of the one or more antennas 760.

In some embodiments, the electronic device 700 may include additional elements such as, for example, memory/storage, display, camera, sensors, and/or input/output (I/O) interface. In some embodiments, the electronic device of FIG. 7 may be configured to perform one or more methods, processes, and/or techniques such as those described herein.

A number of examples, relating to implementations of the techniques described above, will next be given.

In a first example, an eNB that functions as a LTELAA transmission point may comprise circuitry to: adaptively determine an ED threshold value to use when performing a LBT operation, the adaptive determination including selectively choosing the ED threshold value from at least two or more possible ED threshold values; and transmit data, to UE, via LTE-LAA downlink transmission, the transmission including performing the LBT operation using the adaptively determined ED threshold.

In example 2, the subject matter of the first example may further include circuitry to: initially set the ED threshold value to a conservative value; detect a presence of another transmission node; and change the ED threshold value to an aggressive value when another transmission node is not detected at frequency components corresponding to the LTE-LAA downlink transmission or continue to keep the conservative value.

In example 3, the subject matter of the first example or any of the examples described herein may further include an implementation wherein the another transmission node includes a WiFi node.

In example 4, the subject matter of the first example or any of the examples described herein may further include an implementation wherein the eNB, when adaptively determining the ED threshold, further includes circuitry to: initially set the ED threshold value to an aggressive value; detect a presence of another transmission node; and change the ED threshold value to a conservative value when another transmission node is detected at frequency components corresponding to the LTE-LAA downlink transmission.

In example 5, the subject matter of examples 2 or 4, or any of the examples herein may further include an implementation wherein the eNB operates on a 20 Megahertz (MHz) channel and wherein the conservative value is −72 decibel-milliwatts (dBm) or −82 dBm and the aggressive value is −52 dBm.

In example 6, the subject matter of examples 2, 4, or 5, or any of the examples herein may further include an implementation wherein the eNB, when detecting the presence of another transmission node, further includes circuitry to: detect the presence of WiFi beacon frames; or detect the presence of a WiFi preamble transmission.

In example 7, subject matter of examples 2, 4, or 5, or any of examples herein may further include wherein the eNB, when detecting the presence of another transmission node, further includes circuitry to: receive, from the UE, a report relating to a presence of a WiFi transmission node.

In example 8, the subject matter of example 7, or any of examples herein may further include wherein the report from the UE is received periodically or is received based on an event that is detected at the UE.

In example 9, the subject matter of example 1, or any of the examples herein may further include wherein the eNB transmits to the UE based on a transmit power value, and when adaptively determining the ED threshold, the eNB further includes circuitry to: determine, for the UE, a modifier value; and proportionally modify the ED threshold value and the transmit power value based on the modifier value.

In example 10, the subject matter of example 9, or any of the examples herein may further include wherein the proportional modification includes inversely modifying the ED threshold value and the transmit power value such that increases to the ED transmit power correspond to decreases in the transmit power value.

In an eleventh example, an eNB may comprise circuitry to: determine whether a WiFi transmission node is detected in a vicinity of the eNB; determine an energy detection (ED) threshold value based on a result of the determination of whether the WiFi transmission node is detected; measure an amount of energy associated with an Long Term Evolution (LTE)-Licensed Assisted Access (LAA) channel; compare the measured amount of energy to the determined ED threshold value; transmit data, using the channel, when the comparison indicates that the amount of energy associated with the channel is less than the ED threshold value; and refrain from transmitting the data when the comparison indicates that amount of energy associated with the channel is greater than the ED threshold value.

In example 12, the subject matter of example 11, may further include wherein the eNB, when determining the ED threshold value, further includes circuitry to: initially set the ED threshold value to a conservative value; and change the ED threshold value to an aggressive value when a WiFi transmission node is determined to not be in the vicinity of the eNB.

In example 13, the subject matter of example 11, or any of the examples herein, may further include wherein the eNB, when determining the ED threshold value, further includes circuitry to: initially set the ED threshold value to an aggressive value; and change the ED threshold value to a conservative value when the WiFi transmission node is determined to be in the vicinity of the eNB.

In example 14, the subject matter of examples 11 or 12, or any of the examples herein, may further include wherein the eNB operates on a 20 Megahertz (MHz) channel and wherein the conservative value is −72 decibel-milliwatts (dBm) or −82 dBm and the aggressive value is −52 dBm or −62 dBm.

In example 15, the subject matter of examples 12, 13, or 14, or any of the examples herein, may further include wherein the eNB, when determining whether the WiFi transmission node is detected in a vicinity of the eNB, further includes circuitry to: detect the presence of WiFi beacon frames; or detect the presence of a WiFi preamble transmission.

In example 16, the subject matter of example 11, or any of the examples herein, may further include wherein the eNB, when determining whether the WiFi transmission node is detected in a vicinity of the eNB, further includes circuitry to: receive, from User Equipment (UE), a report relating to a presence of a WiFi transmission node.

In example 17, the subject matter of example 16, or any of examples herein, may further include wherein the report from the UE is received periodically or is received based on an event that is detected at the UE.

In example 18, the subject matter of example 11, or any of the examples herein may further include wherein the eNB transmits to User Equipment (UE) based on a transmit power value, and when determining the ED threshold, the eNB further includes circuitry to: determine, for the UE, a modifier value; and proportionally modify the ED threshold value and the transmit power value based on the modifier value.

In example 19, the subject matter of example 18, or any of the examples herein, may further include wherein the proportional modification includes inversely modifying the ED threshold value and the transmit power value such that increases to the ED transmit power correspond to decreases in the transmit power value.

In a 20th example, a computer readable medium may contain program instructions for causing one or more processors to: adaptively determine an energy detection (ED) threshold value to use when performing a Listen-Before-Talk (LBT) operation, the adaptive determination including selectively choosing the ED threshold value from at least two or more possible ED threshold values; and transmit data, to User Equipment (UE), via Long Term Evolution (LTE)-Licensed Assisted Access (LAA) downlink transmission, the transmission including performing the LBT operation using the adaptively determined ED threshold.

In example 21, the subject matter of example 20 may further include wherein adaptively determining the ED threshold, the computer readable medium additionally includes program instructions for causing the one or more processors to: initially set the ED threshold value to a conservative value; detect a presence of another transmission node; and change the ED threshold value to an aggressive value when another transmission node is not detected at frequency components corresponding to the LTE-LAA downlink transmission.

In example 22, the subject matter of example 20, or any of the examples herein, wherein when adaptively determining the ED threshold, the computer readable medium additionally includes program instructions for causing the one or more processors to: initially set the ED threshold value to an aggressive value; detect a presence of another transmission node; and change the ED threshold value to a conservative value when another transmission node is detected at frequency components corresponding to the LTE-LAA downlink transmission.

In example 23, the subject matter of example 21 or 22, or any of examples herein, may further include wherein the eNB operates on a 20 Megahertz (MHz) channel and wherein the conservative value is −72 decibel-milliwatts (dBm) or −82 dBm and the aggressive value is −52 dBm or −62 dBm.

In example 24, the subject matter of examples 21, 22, or 23, or any of the examples herein, may further include wherein when adaptively determining the ED threshold, the computer readable medium additionally includes program instructions for causing the one or more processors to: detect the presence of WiFi beacon frames; or detect the presence of a WiFi preamble transmission.

In example 25, the subject matter of example 20, or any of the examples herein, may further include wherein the data is transmitted to the UE using a transmit power value, and when adaptively determining the ED threshold, the computer readable medium additionally includes program instructions for causing the one or more processors to: determine, for the UE, a modifier value; and proportionally modify the ED threshold value and the transmit power value based on the modifier value.

In example 26, the subject matter of example 25, or any of the examples herein, may further include wherein the proportional modification includes inversely modifying the ED threshold value and the transmit power value such that increases to the ED transmit power correspond to decreases in the transmit power value.

In a twenty-seventh example, a UE may include circuitry to: determine an energy detection (ED) threshold value to use when performing a Listen-Before-Talk (LBT) operation before using an unlicensed frequency channel for uplink transmissions to an LTE-LAA eNB; and transmit data, to the eNB, via LTE-LAA uplink transmission, the transmission including performing the LBT operation using the determined ED threshold.

In example 28, the subject matter of example 27, may further include wherein the ED threshold value is different than an ED threshold value, used by the eNB, for downlink LTE-LAA transmissions.

In example 29, the subject matter of example 27, or any of the examples herein, may further include wherein the ED threshold value is determined to be a same value as ED threshold value, used by the eNB, for downlink LTE-LAA transmissions, plus a predetermined offset amount.

In example 30, the subject matter of example 27, or any of examples herein, may further include wherein determining the ED threshold value includes receiving the ED threshold value, from the eNB, via Dedicated Control Information (DCI) using Layer 1 signaling.

In the preceding specification, various embodiments have been described with reference to the accompanying drawings. It will, however, be evident that various modifications and changes may be made thereto, and additional embodiments may be implemented, without departing from the broader scope as set forth in the claims that follow. The specification and drawings are accordingly to be regarded in an illustrative rather than restrictive sense.

For example, while series of signals have been described with regard to FIGS. 2-5, the order of the signals may be modified in other implementations. Further, non-dependent signals may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions may be implemented as "logic" that performs one or more functions. This logic may include hardware, such as an application-specific integrated circuit ("ASIC") or a field programmable gate array ("FPGA"), or a combination of hardware and software.

Even though particular combinations of features are recited in the claims and/or disclosed in the specification, these combinations are not intended to limit the claims. In fact, many of these features may be combined in ways not specifically recited in the claims and/or disclosed in the specification.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used.

What is claimed is:

1. An evolved NodeB (eNB) that functions as a Long Term Evolution (LTE)-Licensed Assisted Access (LAA) transmission point, the eNB comprising circuitry to:
adaptively determine an energy detection (ED) threshold value to use when performing a Listen-Before-Talk (LBT) operation, the adaptive determination including selectively choosing the ED threshold value from at least two or more possible ED threshold values; and
transmit data, to User Equipment (UE), via LTE-LAA downlink transmission, the transmission including performing the LBT operation using the adaptively determined ED threshold,
wherein the eNB, when adaptively determining the ED threshold, further includes circuitry to:
initially set the ED threshold value to a conservative value;
detect a presence of another, different transmission node; and change the ED threshold value to an aggressive value when the another, different transmission node is not detected at frequency components corresponding to the LTE-LAA downlink transmission or continue to keep the conservative value.

2. The eNB of claim 1, wherein the another transmission node includes a WiFi node.

3. The eNB of claim 1, wherein the eNB, when adaptively determining the ED threshold, further includes circuitry to:
initially set the ED threshold value to an aggressive value;
detect a presence of another transmission node; and
change the ED threshold value to a conservative value when another transmission node is detected at frequency components corresponding to the LTE-LAA downlink transmission.

4. The eNB of claim 1, wherein the circuitry includes:
Radio Frequency (RF) circuitry, front-end module (FEM) circuitry, and one or more antennas to transmit the data; and
baseband circuitry or application circuitry to adaptively determine the ED threshold.

5. The eNB of claim 1, wherein the eNB operates on a 20 Megahertz (MHz) channel and wherein the conservative value is −72 decibel-milliwatts (dBm) or −82 dBm and the aggressive value is −52 dBm.

6. The eNB of claim 1, wherein the eNB, when detecting the presence of another transmission node, further includes circuitry to:
detect the presence of WiFi beacon frames; or
detect the presence of a WiFi preamble transmission.

7. The eNB of claim 1, wherein the eNB, when detecting the presence of another transmission node, further includes circuitry to:
receive, from the UE, a report relating to a presence of a WiFi transmission node.

8. The eNB of claim 7, wherein the report from the UE is received periodically or is received based on an event that is detected at the UE.

9. The eNB of claim 1, wherein the eNB transmits to the UE based on a transmit power value, and when adaptively determining the ED threshold, the eNB further includes circuitry to:
determine, for the UE, a modifier value; and
proportionally modify the ED threshold value and the transmit power value based on the modifier value.

10. The eNB of claim 9, wherein the proportional modification includes inversely modifying the ED threshold value and the transmit power value such that increases to the ED transmit power correspond to decreases in the transmit power value.

11. An evolved NodeB (eNB) comprising circuitry to:
determine whether a WiFi transmission node is detected in a vicinity of the eNB;
determine an energy detection (ED) threshold value based on a result of the determination of whether the WiFi transmission node is detected;
measure an amount of energy associated with an Long Term Evolution (LTE)-Licensed Assisted Access (LAA) channel;
compare the measured amount of energy to the determined ED threshold value;

transmit data, using the channel, when the comparison indicates that the amount of energy associated with the channel is less than the ED threshold value; and refrain from transmitting the data when the comparison indicates that amount of energy associated with the channel is greater than the ED threshold value, wherein the eNB, when determining the ED threshold value, further includes circuitry to:
  initially set the ED threshold value to a conservative value; and
  change the ED threshold value to an aggressive value when a WiFi transmission node is determined to not be in the vicinity of the eNB, or wherein the eNB, when determining the ED threshold value, further includes circuitry to:
  initially set the ED threshold value to an aggressive value; and
  change the ED threshold value to a conservative value when the WiFi transmission node is determined to be in the vicinity of the eNB.

12. The eNB of claim 11, wherein the eNB operates on a 20 Megahertz (MHz) channel and wherein the conservative value is −72 decibel-milliwatts (dBm) or −82 dBm and the aggressive value is −52 dBm or −62 dBm.

13. The eNB of claim 11, wherein the eNB, when determining whether the WiFi transmission node is detected in a vicinity of the eNB, further includes circuitry to:
  detect the presence of WiFi beacon frames; or detect the presence of a WiFi preamble transmission.

14. The eNB of claim 11, wherein the eNB, when determining whether the WiFi transmission node is detected in a vicinity of the eNB, further includes circuitry to:
  receive, from User Equipment (UE), a report relating to a presence of a WiFi transmission node.

15. The eNB of claim 14, wherein the report from the UE is received periodically or is received based on an event that is detected at the UE.

16. The eNB of claim 11, wherein the eNB transmits to User Equipment (UE) based on a transmit power value, and when determining the ED threshold, the eNB further includes circuitry to:
  determine, for the UE, a modifier value; and
  proportionally modify the ED threshold value and the transmit power value based on the modifier value.

17. The eNB of claim 16, wherein the proportional modification includes inversely modifying the ED threshold value and the transmit power value such that increases to the ED transmit power correspond to decreases in the transmit power value.

* * * * *